United States Patent [19]

Ouellette et al.

[11] Patent Number: 5,498,148
[45] Date of Patent: Mar. 12, 1996

[54] APPARATUS FOR FORMING SHEETS OF MATERIAL HAVING A UNIFORM THICKNESS AND CUTTING INDIVIDUAL PORTIONS THEREFROM

[75] Inventors: Edward L. Ouellette, Corinth; Carolyn E. Broyles, McKinney, both of Tex.; Barry F. Wilson, Santa Monica, Calif.

[73] Assignee: Recot, Inc., Plano, Tex.

[21] Appl. No.: 292,816

[22] Filed: Aug. 10, 1994

[51] Int. Cl.6 .................................. A21C 5/00; A23P 1/00
[52] U.S. Cl. .......................... 425/294; 264/153; 264/163; 425/298; 425/363; 426/503
[58] Field of Search ....................... 425/141, 294, 425/298, 315, 363; 264/153, 163; 426/502, 503

[56] References Cited

U.S. PATENT DOCUMENTS

| | | | |
|---|---|---|---|
| 2,737,130 | 3/1956 | Rhodes | 425/367 |
| 3,843,434 | 10/1974 | Keiks et al. | 425/141 |
| 3,907,478 | 9/1975 | Vernon et al. | 425/367 |
| 4,000,402 | 12/1976 | Higham | 425/141 |
| 4,067,677 | 1/1978 | Sakurazawa | 425/141 |
| 4,226,150 | 10/1980 | Reed | 83/344 |
| 4,336,010 | 6/1982 | Thompson | 425/141 |
| 4,372,736 | 2/1983 | Gooch et al. | 425/149 |
| 4,553,461 | 11/1985 | Belongia | 83/344 |
| 4,759,247 | 7/1988 | Bell et al. | 83/346 |
| 4,770,078 | 9/1988 | Gautier | 83/344 |
| 4,787,835 | 11/1988 | Cavanagh | 425/150 |
| 4,810,179 | 3/1989 | Cavanagh | 425/141 |
| 4,838,156 | 6/1989 | Hafner et al. | 100/47 |
| 4,917,590 | 4/1990 | Svengren et al. | 425/321 |
| 5,061,337 | 10/1991 | Fraser | 425/141 |
| 5,079,014 | 4/1992 | Morikawa et al. | 426/502 |
| 5,091,202 | 2/1992 | Hayashi | 426/502 |
| 5,094,790 | 3/1992 | Halter | 425/141 |
| 5,106,636 | 4/1992 | Ban et al. | 426/502 |
| 5,110,277 | 5/1992 | Hayashi | 425/141 |
| 5,124,163 | 6/1992 | Hayashi | 426/502 |
| 5,158,724 | 10/1992 | Yagi et al. | 425/141 |
| 5,174,185 | 12/1992 | Aichele | 83/346 |
| 5,180,593 | 1/1993 | Mistretta et al. | 425/363 |
| 5,204,123 | 4/1993 | Hayashi | 425/141 |
| 5,295,803 | 3/1994 | Ogawa et al. | 425/141 |
| 5,378,133 | 1/1995 | Atwood et al. | 425/141 |

FOREIGN PATENT DOCUMENTS 2750530  11/1977  Germany.

Primary Examiner—George Yeung
Attorney, Agent, or Firm—Rothwell, Figg, Ernst & Kurz

[57] ABSTRACT

An apparatus for forming a sheet of material, e.g., dough or masa, from a supply of the material includes a pair of rotatable rollers that define therebetween a gap into which is input a dough mass and out of which is produced a dough sheet. Fluctuations in the size of the roller gap are sensed by detecting changes in the position of one of the rollers, which changes are input to a servo system that automatically corrects the position of the one roller so as to maintain the proper gap size. The one roller is movably mounted in scissor-like fashion and is easily driven by a servo motor. A cutter is provided which presses against one of the rollers to cut individual dough portions from the sheet. The ends of the cutter are subjected to a bending moment which induces a camber in the cutter. This prevents the central portion of the cutter from bowing away from the roller and ensures uniform pressure between the cutter and roller, even for applications with an extremely long cutter and rollers.

12 Claims, 4 Drawing Sheets

5,498,148

APPARATUS FOR FORMING SHEETS OF MATERIAL HAVING A UNIFORM THICKNESS AND CUTTING INDIVIDUAL PORTIONS THEREFROM

BACKGROUND OF THE INVENTION

1. Field of the Invention

The present invention relates to an apparatus for forming a sheet of material and cutting individual portions of the material from the sheet. More particularly, the invention relates to an apparatus for forming a sheet of dough material, e.g., masa (corn-based dough), and cutting individual portions or chips from the sheeted dough.

2. Description of Relevant Art

Apparatus for forming sheets of various materials, including dough or the like food products, which force the material through a gap or nip located between a pair of rotating rollers are well known in the art. In such apparatus, the supply of dough is positioned above the gap formed between the confronting rollers, a dough mass is forced into the gap, and the rollers form the dough into a sheet. The sheet then is cut or suitably portioned, and the portions are then processed according to the desired product. For example, in the case of snack foods, the cut portions are baked or fried, seasoned, etc.

Various problems exist in the production of sheeted materials using the aforementioned apparatus. For example, the thickness of the final product (which may be, e.g., tortilla chips), strongly influences the product attributes that are important to consumers. In other words, a product that is too thick typically is unacceptable or unsatisfactory to consumers.

In the prior art dough-sheeting machines mentioned above, variations often are present in the rheology of the dough or masa mass that is fed into the gap between the rollers. Such variations may exert substantial pressure on the rollers and cause the framework which supports the rollers to deflect, resulting in changes in roller gap size, which in turn result in variations in the thickness of the sheet and thus the final product. At present it is not practical to directly measure the thickness of the sheet output by the rollers. This problem currently is handled by a sheerer apparatus operator who monitors such deflections and manually adjusts the position of one of the rollers. These manual adjustments typically are required about 20–30 times during a seven hour period. In addition, manual adjustment of the roller gap size is unsatisfactory in that this method yields products about 30% of which are down-graded by consumers as being too thick. Accordingly, there is a need in the art for an apparatus and method for producing sheeted materials having a uniform thickness.

The dough sheet formed by the rotating rollers as described above is subjected to a cutting procedure in which individual portions of dough are cut from the sheet. Specifically, a rotating cutter typically is positioned so as to press against the surface of one of the rollers. As the dough sheet adheres to the roller, the exterior surface of the cutter, which is configured to cut-out the portions in a desired shape, engages the dough sheet and cuts such portions from the remainder thereof. A stripper wire assembly then separates the cut-out portions which are carried by a conveyor or run-out table to the next processing stage.

The length of the rollers which sheet the dough in the aforementioned apparatus may be around three feet, e.g., 39 inches, and thus produce a three foot wide dough sheet. However, some applications utilize longer rollers, e.g., 46 inches, which produce wider sheets of dough. In any event, the cutter used with such apparatus has a length corresponding to that of the rollers (as the exterior surface of the cutter presses against the dough sheet adhering to the roller). The considerable length of the cutter causes several problems.

In order to adequately cut the dough sheet carried by the one roller, the cutter must be pressed against the roller over the entire length thereof. Furthermore, the pressure exerted by the cutter against the roller must be uniform over its length to produce even and uniform product portions. The cutter has opposite ends which are journalled in bearings disposed outside the cutter portion which engages the roller. Force is applied against the bearing housings by air cylinders or springs to lift or press the cutter against the roller. However, because of the considerable length of the cutter, the forces applied to or adjacent the ends thereof cause bowing at the central portion thereof. More particularly, the bowing reduces pressure and cutting effectiveness at the center of the cutter.

In prior art apparatus, some cutters are crowned (formed with a special profile at the center) to compensate for the aforementioned bowing. However, the amount of crowning is determined by a trial and error process and does not always yield successful results. In addition, the cutter must be re-machined periodically to account for wear of the special profile or to permit its use for new applications. Further, the cost of the cutter is increased due to the special machining necessary to form the profile.

Another prior art solution to the problem of cutter bowing, particularly if the cutter length exceeds 30 inches, is to provide center supports that press the center of the cutter against the roller. This solution, however, is unacceptable in that the center supports require frequent maintenance and add to the complexity of the apparatus. In addition, such inboard center supports reduce the effective area for forming product, and thus, increase the amount of lace (i.e., recycled masa returned to the dough mass supplied to the roller gap). Accordingly, there is a need in the art for an improved cutter assembly for a sheeter apparatus.

SUMMARY OF THE INVENTION

The present invention provides an apparatus for forming a sheet of material from a supply of the material, which may be, e.g., dough, corn masa, etc. The apparatus includes a support with a pair of rotatable rollers mounted thereon to define a gap therebetween. A mass of the material is fed into the gap and the rollers form the material into a sheet, the sheet adhering to one of the two rollers. A rotating cutter is secured adjacent the one roller and is pressed thereagainst to cut out individual portions of the sheet.

In one aspect of the present invention, the cutter includes an elongated member having opposite ends and a central portion, the latter having an exterior surface which is pressed against the roller. The opposite ends are journalled in bearings against which a force is applied to press the central portion of the cutter against the roller. Each of the opposite ends are subjected to a bending moment which induces a camber in the cutter that provides a substantially uniform pressure across the interface of the cutter central portion and the roller surface. This arrangement prevents reduced cutting effectiveness at the center of the cutter. The bending moments preferably are produced by air cylinders disposed outward of the bearings, which cylinders apply an adjustable force opposite the force applied to the bearing housings.

In another aspect of the present invention, the apparatus includes first and second rotatable rollers for sheeting the material, wherein the relative position of the rollers is automatically adjustable in response to variations in the roller gap caused by fluctuations in the rheology of the dough mass fed therein. In particular, one of the rollers preferably is mounted in a fixed position on the apparatus support and the other of the rollers is mounted so as to be movable toward and away from the one roller. The movable roller is secured to a frame member that is pivotally mounted on the support in scissor-like fashion with the roller disposed at one end of the frame and a drive device disposed at the opposite end of the frame.

The fluctuations in roller gap size are sensed by one or more position indicators which detect movement of the roller caused by changes in the rheology of the dough mass. In response to the detected roller positions, a servo system continuously corrects the gap size via a drive device which adjusts the position of the one roller. The rollers are thus automatically aligned to within a very specific range, e.g., 0.0001 inch.

Other features, benefits and advantages of the present invention will become apparent from the following description of preferred embodiments thereof taken in conjunction with the accompanying drawings wherein:

DETAILED DESCRIPTION OF PREFERRED EMBODIMENTS

Figure 1:
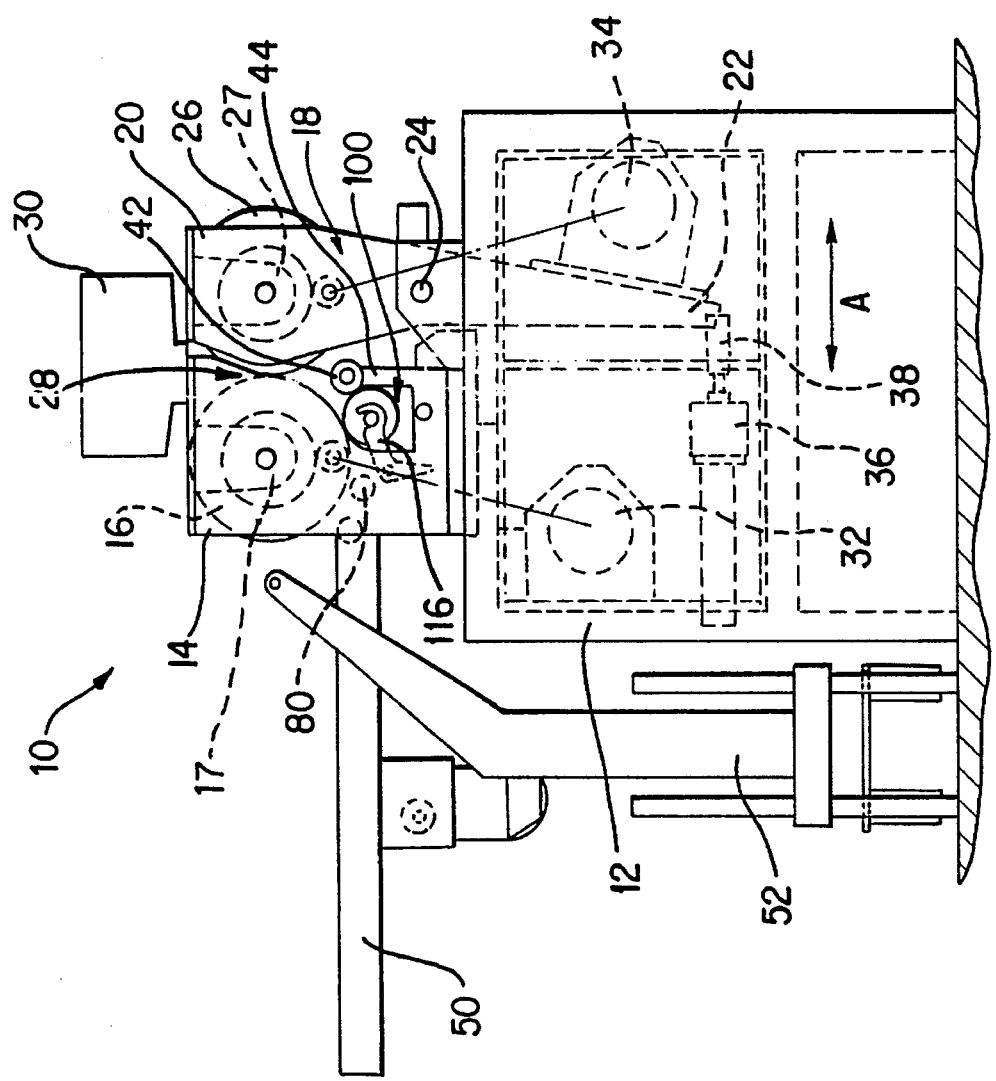
FIG. 1 is a side elevation view of an apparatus for forming a sheet of material having a uniform thickness and cutting individual portions of the material from the sheet according to the present invention.

With reference to the FIGURES, an apparatus for forming a sheet of material having a uniform thickness and cutting individual portions of the material from the sheet is indicated generally by the reference numeral 10. The apparatus 10, referred to herein as a sheerer apparatus, may be used to sheet various materials, and although the apparatus is described below in preferred embodiments as sheeting dough products, e.g., corn-based masa, it will be appreciated that such description is for exemplary sake only.

The sheerer apparatus 10 includes a support 12 to which is secured a front frame member 14 that rotatably supports a front roller 16, and a rear frame member 18 that rotatably supports a rear roller 26. Front roller 16 is mounted on bearings 17 and rear roller 26 is mounted on bearings 27 to provide for smooth rotation. Front frame member 14 preferably is fixed to support 12 and, therefore, the position of front roller 16 is fixed with respect to support 12 as well. Rear frame member 18 includes a first upper end 20 and a second lower end 22 and is secured to support 12 so as to be adjustable with respect thereto. Specifically, frame member 18 is pivotally connected to support 12 at pivot point 24 and, together with frame member 14, forms a scissor-like mounting arrangement for rollers 16 and 26. The rear frame member 18 also is disposed in a support assembly 13 (which forms part of support 12).

Rear roller 26 is movable toward and away from front roller 16 to permit adjustment of the gap or nip 28 defined between said rollers. It will, of course, be recognized that it is possible to vary the configuration of the roller frame members from that shown in FIG. 1, while still achieving the adjustable relative mounting of the rollers which forms part of the present invention. By adjusting the size of the gap 28, the thickness of the sheet produced by the rotating rollers 16, 26 may be precisely controlled. A mass of dough is fed from the dough hopper 30 into the gap 28 where it is forced between the rotating rollers 16, 26 and sheeted to a desired thickness. The so-formed dough sheet then adheres to front roller 16 due to a differential speed between rollers 16 and 26. The front roller 16 is rotatably driven by a drive 32 and rear roller 26 is rotatably driven by a drive 34 as is known in the art. The dough sheet then is engaged by a cutter 100 as will be described below.

The rear frame member 18 is pivoted to support 12 as noted above. The lower end 22 of frame member 18 is engaged by a drive motor 36 via a gear system 38 so as to be movable in an adjustable fashion. More specifically, the position of rear roller 26 is adjusted relative front roller 16 by selectively driving the lower end 22 of frame 18, i.e., by moving end 22 to the left and right as indicated by arrow A in FIG. 1. Driving the end 22 of frame 18 in this manner causes the frame to pivot about connection 24 in scissor-like fashion, with rear roller 26 moving toward or away from front roller 16 to adjust the size of roller gap 28. It is apparent that rear roller 26 moves in a direction opposite to the direction in which the lower end 22 of frame 18 is moved.

Figure 5:
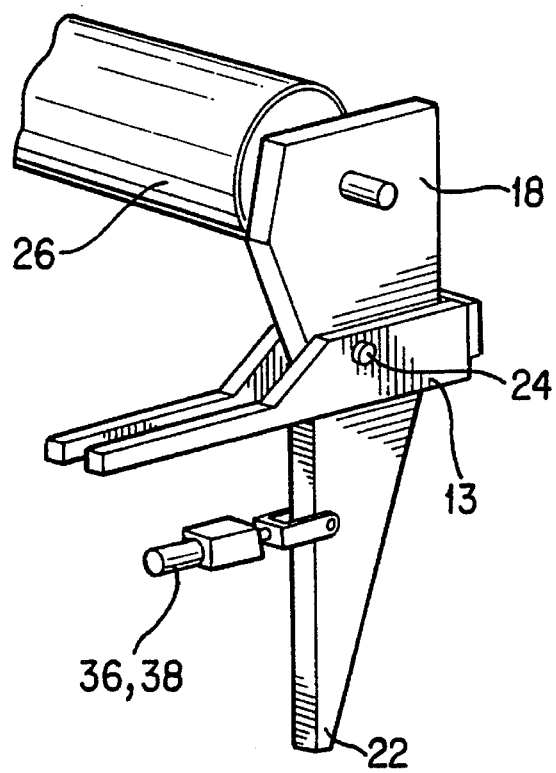
FIG. 5 is a perspective view of the rear roller and adjustable frame of the apparatus shown in FIG. 4.

FIGS. 3 and 5 show a sheeter apparatus as described above; however, the rear frame member 18 (FIG. 3) is modified and is driven at its middle portion as opposed to its lower end 22. It will be clear to persons skilled in the art that the rear frame member can be driven at various locations to effect the desired movement thereof.

The rear frame member 18 is mounted on anti-friction bearings to facilitate smooth and easy movement of the frame about pivot axis 24 and along support assembly 13. Thus, friction-free adjustment of the frame 18 and rear roller 26 is achieved. In addition, the length of rear frame 18, i.e., the length of the scissor arm, can be selected to maximize the mechanical advantage afforded by same, thereby reducing the amount of force that must be exerted on lower frame end 22 by drive device 36. Further, the scissor mounting assembly contains fewer moving parts and is therefore less complicated and costly that the sliding mechanisms used in prior art dough sheeting apparatus.

As discussed above, variations in the rheology of the dough mass can exert considerable pressure on the rollers and deflect the movable rear frame member 18, which results in the size of roller gap 28 fluctuating from the desired value. This produces product having an inconsistent and unacceptable thickness.

Figure 4:
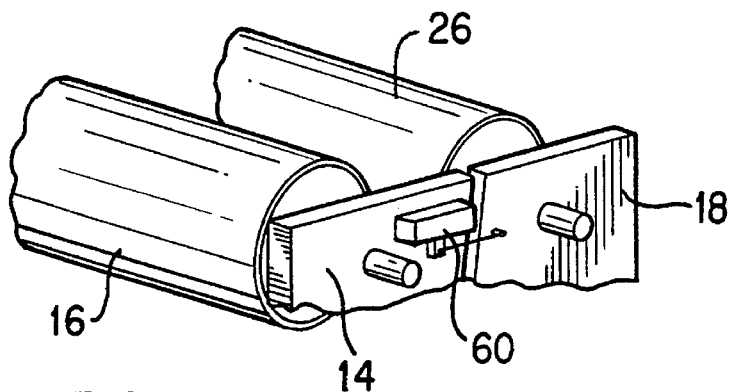
FIG. 4 is a perspective view of the upper portion of the apparatus shown in FIG. 3.

The present invention provides for automatic and continuous monitoring and adjustment of the size of roller gap 28 so as to ensure uniform and consistent dough sheet (and thus product) thickness. A sensor 60, preferably in the form of one or more position indicators, is disposed as shown in FIG. 4 and detects the position of rear roller 26 by sensing the relative position of the frame members 14 and 18. Sensor 60, which in a preferred embodiment is a linear gap indicator, feeds the detected positions of roller 26 to a microprocessor in the control unit of a servo system (not shown), which system compares the detected positions to previously stored values corresponding to the desired roller gap size. The servo system then controls the drive for rear frame 18 to move the rear roller 26 to the proper position, i.e., to the position at which the gap size resumes its desired value. Accordingly, the desired roller gap size, and thus the desired sheet thickness, are maintained without having to monitor or measure the thickness of the output dough sheet.

A suitable software program coordinates the functions of the sensor 60 and the servo motor drive-gear assembly 36, 38 for rear roller 26. In a preferred embodiment, the sampling time of the servo system is approximately 5 seconds, and the system is continuously active and responds to detected roll movements that are as small as 0.0001 inch. Moreover, the system permits adjustment of the rollers to within 0.0001 inch. The servo system preferably is connected to a safety switch on the apparatus and will automatically open the rollers 16, 26 when the safety is activated.

In a further aspect of the invention, the servo system may be used to accurately measure spreading forces created during sheeting of dough. This is done by developing a calibration curve for various servo motor rotation values corresponding to known forces applied to the rollers. The servo motor readings needed to correct roller deflection during a sheeting operation are then compared to the previously obtained values to determine the forces generated during the operation. This feature permits the invention to be used as an analytical tool with respect to the analysis of the forces developed during a sheeting operation.

Figure 2A:
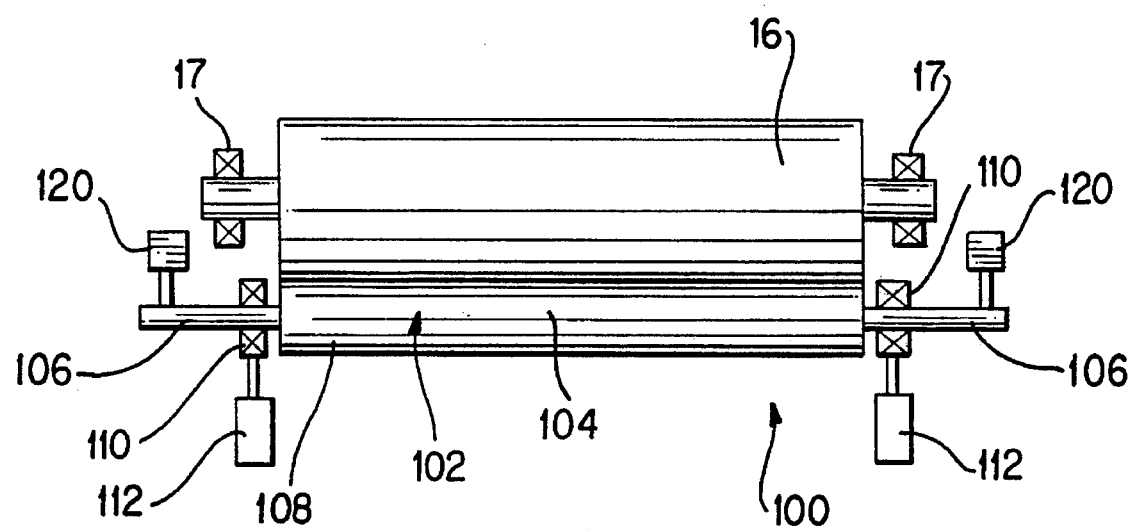
FIG. 2A is a front elevation view of a portion of the apparatus shown in FIG. 1 including one of the sheeting rollers and a cutter assembly.
Figure 3:
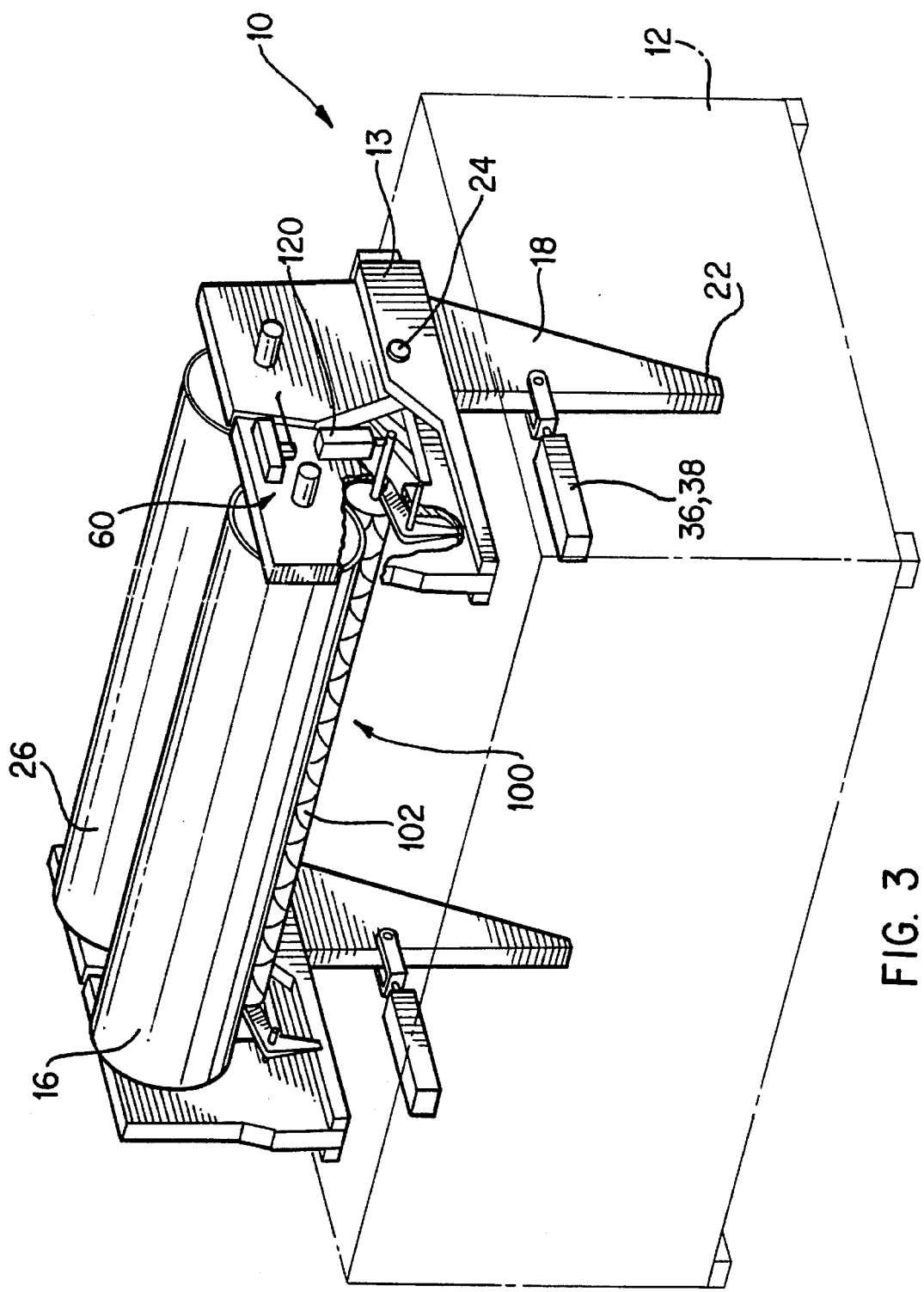
FIG. 3 is a perspective view of the apparatus shown in FIG. 1 modified and with portions broken away for clarity.
Figure 6:
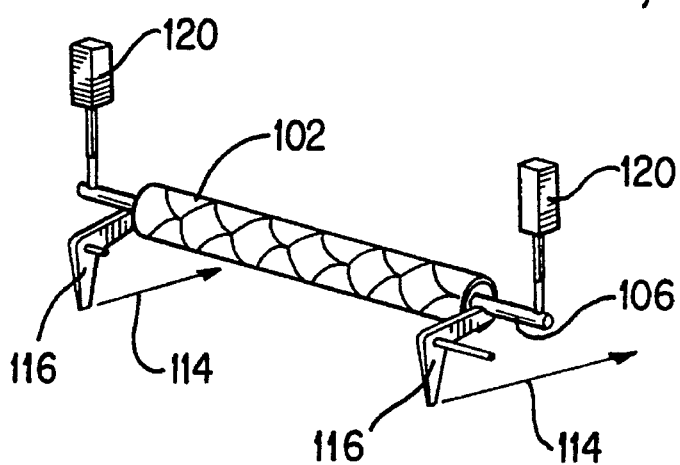
FIG. 6 is a perspective schematic view showing the mounting arrangement for the cutter in the apparatus shown in FIG. 5.

The sheet of dough formed by the rollers adheres to front roller 16 due to the latter being rotated at a greater rate than rear roller 26. A cutter assembly 100 is positioned so as to abut against the surface of front roller 16 as seen in FIGS. 1 and 3. Cutter assembly 100 is shown more clearly in FIG. 2A (and FIG. 6) and includes an elongated cutter member 102 having a central portion 104 which is pressed against the surface of front roller 16 over its length. As seen in FIGS. 1 and 6, the cutter assembly is mounted on brackets, i.e., pivoted cradle arms, 116 which are secured to support 12 so as to permit adjustment of the cutter member 102 relative front roller 16. In addition, a brush assembly 42 is mounted on a brush support 44 secured to support 12, which brush 42 serves to clean the cutter during operation of the sheeter apparatus.

The exterior surface 108 of the central portion 104 of cutter member 102 is configured to cut out individual portions of the sheeted material from the sheet by pressing against the surface of front roller 16 (which acts as an anvil for the cutter). The particular configuration of the cutter surface 108 (FIG. 6) depends on the desired shape and/or pattern of the final product. A stripper wire assembly 80 is provided adjacent the front roller 16 to separate the cut-out portions as is known in the art.

The elongated cutter member 102 has opposite ends 106 a portion of which respectively is journalled in bearing housings 110 to provide for smooth rotation of member 102. As discussed above, a lift force is applied against bearing housings 110 in the direction toward front roller 16 to press the central portion 104 of cutter member 102 against roller 16. These forces preferably are applied in an adjustable manner by lift cylinders 112, which are in the form of adjustable air cylinders.

A preferred embodiment includes cradle arms 116 which are generally L-shaped and fixed to the apparatus with a pivot axis running parallel to the cutter member 102. One end of each cradle arm 116 engages an end 106 of cutter 102 as shown in FIG. 6. A cable 114 engages the opposite end of each cradle arm 116 and connects same to the output of the lift cylinders 112. The lift cylinders 112 may be activated to pull cables 114 in the direction of the arrows in FIG. 6, which causes cradle arms 116 to pivot and exert an upward force against the ends 106 of cutter member 102. In this fashion, the cutter member 102 may be adjustably pressed against the front roller 16.

Figure 2B:
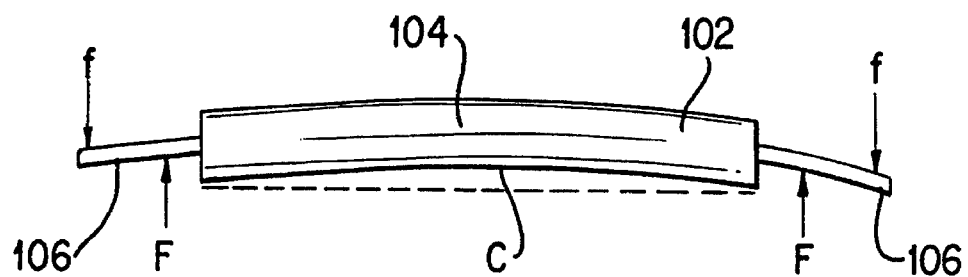
FIG. 2B is a force diagram showing the forces applied to the cutter of the apparatus depicted in FIGS. 1 and 2A.

In order to prevent bowing and ineffective cutting of the dough sheet at the area near the center of portion 104 of cutter member 102, the present invention provides two force-generating members 120. Members 120 exert a force on ends 106 in an opposite direction to that applied to cradle arms 116 by lift cylinders 112 which results in a bending moment being applied to the ends 106. As seen in FIGS. 2A and 2B, members 120 are disposed outward from the point at which the force from lift cylinders 112 is applied. This configuration results in a camber C being induced in the elongated cutter member 102 (FIG. 2B). The force f applied by force-generating members 120 typically will be relatively small compared with the force F applied by lift cylinders 112. This arrangement results in the central portion 104 of cutter member 102 assuming a cambered shape in the direction toward roller 16. In this manner, the elongated cutter member 102 exerts a uniform pressure against roller 16 over the entire interface therebetween.

The force-generating members 120, designated as trim cylinders, preferably are in the form of air cylinders the output of which is adjustable. By adjusting the forces exerted on cutter member 102 by the trim cylinders 120 and lift cylinders 112 (i.e., by adjusting the air pressure therein), the amount of camber induced in the cutter member 102 can be precisely controlled. This permits the pressure exerted by the cutter member 102 against roller 16 to be made uniform across the interface therebetween under many different circumstances and applications and, as such, results in consistently formed individual dough portions.

The benefits of the induced-camber cutter assembly include increased area for cutting product portions due to the absence of the inboard cutter supports found in prior art apparatus, an overall simpler and more lightweight cutter design, and reduced overall cutter assembly maintenance.

While the present invention and the embodiments presented herein have been set forth and described in detail for the purposes of making a full and complete disclosure of the subject matter thereof, the disclosure herein presented is not intended to be limiting in any way with respect to the scope of this invention as the same is set forth in the appended claims.

What is claimed is:

1. An apparatus for forming a sheet of material from a supply of the material, and for cutting portions of the material from the sheet of material, the apparatus comprising:

a support;

first and second rotatable rollers positioned adjacent each other to form a gap therebetween for receiving the material from the supply and outputting a sheet of the material;

a drive for rotating the rollers;

the first roller being movable toward and away from the second roller to adjust the size of the gap formed between the rollers;

the first roller being secured to a frame member having first and second ends, the frame member being pivotally mounted to the support with the pivot point of the frame member being located between the first and second ends thereof, and the first roller being secured to the frame member between the pivot point and the first end of the frame member;

a drive device disposed adjacent the second end of the frame member for pivoting the frame member about said pivot point to adjust the position of the first roller with respect to the second roller so as to control the size of the said gap; and a cutter secured to the support and pressed against one of the rollers for engaging the sheet of material and cutting individual portions from the sheet;

whereby the material is fed into the gap with the rollers rotating to form a sheet of material which is output from the gap by the rollers and cut into individual portions by the cutter.

2. An apparatus according to claim 1, wherein the first roller and the drive device are disposed, respectively, at the first and second ends of the frame member with the pivot point located therebetween.

3. An apparatus according to claim 1, wherein the drive device is a servo motor which moves the second end of the frame member in response to fluctuations in the size of the gap formed between the rollers, which fluctuations are detected by a sensor and fed back to a control unit for the servo motor.

4. An apparatus according to claim 3 wherein the drive device includes a gear arrangement for transmitting the driving force of the motor to the frame member.

5. An apparatus according to claim 1, wherein the position of the first roller is adjustable and the position of the second roller is fixed.

6. An apparatus for forming a sheet of material from a supply of the material and for cutting portions of the material from the sheet of material, the apparatus comprising:

a support;

front and rear rotatable rollers mounted on the support and positioned adjacent each other to define a gap therebetween into which is fed a supply of the material and out of which is output the sheet of material, the sheet of material adhering to the front roller upon being output from the gap;

a drive for rotating the front and rear rollers; and a cutter secured to the support, the cutter including an elongated member having an exterior surface configured to cut individual portions of the material from the sheet of material, the elongated member having opposite ends and a central portion disposed between the opposite ends;

wherein the cutter is secured to the support with the central portion of the elongated member pressed against the front roller for cutting the sheet of material into the individual portions, the opposite ends of the elongated member each being journalled in a bearing and having a lift force applied thereagainst to press the central portion of the elongated member against the front roller, and wherein a bending moment is applied to each of the opposite ends of the elongated member to induce a camber in the elongated member and provide a uniform pressure across the interface of the central portion thereof and the front roller;

whereby bowing of the cutter and resultant reduction in pressure between the elongated member and front roller is prevented.

7. An apparatus as claimed in claim 6, wherein the bending moment is applied to each of the opposite ends of the elongated member by a trim cylinder which applies a force thereto in an opposite direction to the lift force applied to the ends of the elongated member.

8. An apparatus as claimed in claim 7, wherein the bearings have the lift force applied thereagainst and are located nearer the center of the elongated member than the trim cylinders with the elongated member being free of supports between the bearings.

9. An apparatus as claimed in claim 7, wherein the lift force is applied against each bearing and, along with the force applied by each trim cylinder, is applied by an air cylinder so as to be adjustable.

10. An apparatus as claimed in claim 7, wherein each end of the elongated member engages a bracket that is pivotally secured to the support, and the lift force is applied to the the brackets and transmitted to the ends of the elongated member.

11. An apparatus as claimed in claim 7, wherein a brush is secured to the support adjacent the cutter for contacting and cleaning the cutter.

12. An apparatus as claimed in claim 7, wherein a stripper wire assembly is provided adjacent the front roller for separating the individual cut portions from the remaining sheet of material.

\* \* \* \* \*